(12) United States Patent
Westcott (10) Patent No.: US 10,627,219 B2
(45) Date of Patent: Apr. 21, 2020

(54) APPARATUS AND METHODS FOR MONITORING MOVEMENT OF PHYSICAL STRUCTURES BY LASER DEFLECTION

(71) Applicant: Intelligent Structures, Inc., Menlo Park, CA (US)

(72) Inventor: Brian Westcott, Menlo Park, CA (US)

(73) Assignee: Intelligent Structures, Inc., Menlo Park, CA (US)

( * ) Notice: Subject to any disclaimer, the term of this patent is extended or adjusted under 35 U.S.C. 154(b) by 0 days.

(21) Appl. No.: 15/890,751

(22) Filed: Feb. 7, 2018

(65) Prior Publication Data

US 2018/0164093 A1 Jun. 14, 2018

Related U.S. Application Data

(63) Continuation of application No. PCT/US2016/047049, filed on Aug. 15, 2016.

(60) Provisional application No. 62/205,171, filed on Aug. 14, 2015.

(51) Int. Cl.
*G01M 5/00* (2006.01)
*G01B 11/16* (2006.01)

(52) U.S. Cl.
CPC .......... *G01B 11/16* (2013.01); *G01M 5/0008* (2013.01); *G01M 5/0091* (2013.01); *G01B 2210/58* (2013.01)

(58) Field of Classification Search
CPC . G01B 11/16; G01B 2210/58; G01M 5/0008; G01M 5/0091
USPC ........................................................ 73/773
See application file for complete search history.

(56) References Cited

U.S. PATENT DOCUMENTS

| 4,671,654 A | | 6/1987 | Miyahara et al. |
| 5,373,343 A | * | 12/1994 | Nonaka ................... G01S 17/87 396/95 |
| 5,465,241 A | * | 11/1995 | Narahara ............. G11B 7/0031 369/44.11 |

(Continued)

FOREIGN PATENT DOCUMENTS

| WO | WO-03019113 A1 | 3/2003 |
| WO | WO-2017031064 A1 | 2/2017 |

OTHER PUBLICATIONS

International search report and written opinion dated Oct. 31, 2016 for PCT Application No. US-1647049.

(Continued)

*Primary Examiner* — Max H Noori
(74) *Attorney, Agent, or Firm* — Wilson Sonsini Goodrich & Rosati (57) ABSTRACT

A system for measuring movement of a structural component of a structure includes a projector which directs a laser or other trackable beam from an origin having a fixed location relative to the structure to a target surface configured to be fixed to the structural component. The beam strikes the target surface to produce a trackable spot at an incidence location on the target surface. A camera coupled to the target surface tracks the position of the incidence location as it moves on the target surface over time in response to relative movement between the structural component and the origin. A computer processor receives data from the camera and calculates the magnitude of movement of the structural component relative to the origin.

27 Claims, 4 Drawing Sheets

(56) References Cited

U.S. PATENT DOCUMENTS

| | | | |
|---|---|---|---|
| 6,294,775 B1 * | 9/2001 | Seibel | A61B 1/0008 |
| | | | 250/208.1 |
| 2004/0107671 A1 | 6/2004 | McGinnis et al. | |
| 2006/0139923 A1 | 6/2006 | Feinsod et al. | |
| 2007/0081168 A1 | 4/2007 | Johnston | |
| 2008/0304065 A1 | 12/2008 | Hesser et al. | |
| 2009/0039235 A1 * | 2/2009 | MacFarlane | G01R 33/28 |
| | | | 250/206.1 |

OTHER PUBLICATIONS

Park, et al., Rotational Angle Measurement of Bridge Support Using Image Processing Techniques, Journal of Sensors, 2016:1-9.

* cited by examiner

APPARATUS AND METHODS FOR MONITORING MOVEMENT OF PHYSICAL STRUCTURES BY LASER DEFLECTION

CROSS-REFERENCE TO RELATED APPLICATIONS

This application is a continuation of PCT Application No. PCT/US2016/047049, filed Aug. 15, 2016, which claims the benefit of provisional patent application 62/205,171, filed on Aug. 14, 2015, the full disclosures of which is incorporated herein by reference.

BACKGROUND OF THE INVENTION

1. Field of the Invention

The present invention relates generally to measurement instruments and more particularly to an instrument that can measure and monitor the movement of a structure in all directions.

Measuring the relative movement of structural components of bridges, buildings, power transmission structures and lines, pipelines, tunnels, roadways, and other infrastructure, is useful in a variety of circumstances. The amount of relative movement or deflection of structural components in response to various loads and environmental factors can help understand and analyze the performance of a a partial or entire structure. Measured structural deflection can be compared a design baseline to determine the actual performance of the structure. Data acquired by measuring relative motion in real time over extended periods can be used for dynamic analysis of the structure as well as for improving future designs by enabling adaptive learning of how a structure performs under actual physical environments for comparison with the design performance.

The measurement of movement or deflection of the structural components of bridges is particularly to assure long term performance and safety of the bridge. Real time measurement of bridge motion and/or deflection can be used to test the performance of the bridge. Tests may be cared out under known conditions, such as loading the bridge roadway with a vehicle of known weight, to review actual bridge performance with that weight versus the performance predicted with structural models and calculations.

2. Description of the Background Art

A rail sensing and analysis system which utilizes a laser sensor to detect displacement of a rail resulting from loads imposed by a passing rail vehicle is described in Patent Publication No. 20080304065.

SUMMARY OF THE INVENTION

The present invention provides a method and system for measuring and tracking movement of a structural component of a structure relative to another location on the structure or a location adjacent to the structure. The system includes a laser or other detectable beam source which is fixed or otherwise coupled to the structure or a location adjacent to the structure, a target surface configured to move in unison with a location on the structural component and to receive a beam from the laser, and a computer processor which receives data from the target surface and which can calculate movement of the structural component relative to the beam source. The target surface usually includes a camera or optic array to track the beam as it travels over the surface, a computer processor to calculate the relative motion or generate data to be transmitted to an external computer processor top make such calculations, as well as communications and other circuitry.

The laser can be secured to a stable reference structure or point, referred to as an origin, which will be expected to move less than the structural component that is being monitored for movement. In the case of a bridge, the reference structure or origin can be a bridge pier which will be expected to be stable relative to other components such as roadways, towers, cables, and the like. Alternatively or additionally, the reference or origin may be located on a separate structure or directly on land adjacent to the bridge or other structure being monitored for movement. The reference point or origin should have a maximum expected motion or travel which is no more than 20% of that expected for the structural component being monitored, preferably being no more than 10%, more preferably being no more than 5%, and still more preferably being 1% or less.

The laser directs a beam onto a target surface of a device which is attached to a moving portion of the structure. The target surface may be a panel, screen, filter or the like, and produces an image, spot or point on the surface that can be tracked by a camera or other position-sensitive detector. Alternatively, the target surface could comprise a light- or radiation-sensitive surface that allows direct tracking of the beam as it scans over the surface.

When used, a camera can be configured to detect and or record the laser image, spot, or point that is produced on the panel target device. Software can employ as thresholding, curve fitting, centroid, center of mass, geometric center, and other algorithms to calculate the position of the laser image or point as it moves in real time. The position of the laser image, spot or point on the target device derived from position sensitive detector or camera with algorithms can be used to accurately detect movement or deflection of the structure. The laser will remain fixed and as the structure with target device attached moves or deflects due to environmental or physical load the laser image or point on the target device screen will move proportionally. The camera or position sensitive detector will detect the image position referenced against time. The difference in position of the laser image will be compared over time to the base position or reference starting image position. The differences in the position of the laser image or point in 2 dimensions perpendicular to the laser beam will be directly proportional to the movement of the bridge or structure. Using the position of the laser image or point the absolute movement or deflection of a structure can be determined.

This information can be recorded and stored at the target device and or sent through wireless or directly wired to a local device or through a wireless connection or directly wired to a remote location for storage and further analysis. The device can be used in connection to other sensors such as strain gauges, temperature, wind indicators and other sensors. The data from all the sensors can be factored into the calculation of deflection. Multiple deflection gauges can also be used together to give a more detailed measurement of how the entire structure is behaving during operation.

In a first aspect of the present in invention, a method for measuring movement of a structural component of a structure comprises projecting a laser or other focused (collimated) beam along a path from an origin. The path intersects a target surface attached to the structural component at an incidence location. Movement of the incidence location on the target surface is tracked over time, and movement of the structural component relative to the origin is determined based on the tracked movement of the incidence location on the target surface.

The laser or other beam source may be attached to a location on the structure or may be attached at a location remote and isolated from the structure, such as on land or another structure which is adjacent to the structure being monitored. By isolated, it is meant that the remote location will be free from many or most stresses which directly affect the structure being monitored. In at least most cases, the location of the laser or other beam source is more resistant to movement than is the structural component which is being tracked. For example, when the structure is a bridge, the origin may be on a pier of the bridge which is subject to less displacement than many other structural components of the bridge. The structural component being monitored may for example be part of a roadway, a superstructure, a cable, a truss, or the like of the bridge.

In some cases, the laser or other beam source can include circuitry which compensates for unintended motion of the source. For example, a three-axis accelerometer or other motion detection circuitry can be mounted on or coupled to the beam source, its housing, or its mountain structure to detect any motion of the beam source while the beam is being transmitted. By detecting and the direction and magnitude of such intended motion, the movement calculation of the target surface can be corrected to remove any artifact that that results from movement of the beam. The motion detection circuitry coupled to the beam source will produce a digital or other signal which can be transmitted to the computer processor that is calculating motion data for the target surface.

The target surface is usually planar but could be curved, concave, convex, or have other geometries so long as the software tracking the spot produced by incident beam 9 configured to account for any deviations from planarity. The incident beam will preferably be oriented normally or perpendicularly relative to a planar target surface, but in other cases could be oriented at an incidence angle in the range from 75° to 115°, or more, relative to the beam path.

Exemplary target surfaces may be translucent, and movement of the beam incidence location over the translucent target surface may be performed with a camera located behind the translucent surface, and the focused beam path may be aligned to intersect the target surface near a center thereof when the structural component is at rest relative to the origin of the path. In exemplary cases, the target surface has a circular periphery and the beam path intersects the target surface at a center of the circular periphery when the structural component is at risk.

In specific embodiments of the methods herein, unintended motion of the origin of the focused beam path (e.g. the laser beam source) may be tracked, and the resulting motion data used to compensate for source motion errors when calculating movement of the structural component relative to the origin based on the tracked movement of the incidence location on the target surface.

In other specific embodiments of the methods herein, movement data generated by the target surface and related circuitry may be transmitted to a local control unit associated with the structure and/or be transmitted to a remote data storage or processing site, e.g. the "cloud."

In a second aspect of the present in invention, a system for measuring movement of a structural component of a structure comprises a projector configured to direct a beam from an origin having a fixed location relative to the structure. A target surface is configured to be fixed to the structural component and to receive the beam from the projector at an incidence location on the surface. A camera is coupled to the target surface to detect the position of the incidence location as it moves over time in response to relative movement between the structural component and the origin, and a computer processor configured to receive data from the camera and calculate the magnitude of movement of the structural component relative to the origin over time.

The beam projector may comprise a laser, and the laser may be configured to be mounted on a location on the structure. Typically, the location on the structure is more resistant to movement than is the structural component. For example, the structure may be a bridge and the laser may be configured to be secured to a pier or other stable location on the bridge while the target surface is configured to be secured to a roadway, truss, cable, or other component of the superstructure which will be more affected by traffic, wind, and other stress factors.

In particular examples, the laser or other beam source may be configured to be attached to a secondary structure which is isolated from the structure which includes the structural component. Alternatively, the laser or other beam source may be configured to be mounted adjacent to a bridge, and the target surface may be configured to be secured to a pier, a roadway, or a superstructure of the bridge.

In other specific examples, the target surface may comprise a translucent screen which produces a spot when hit by the beam. The target surface may further comprises a camera which can track the spot as it moves over the target surface in response to movement of the structural component.

In still other specific embodiments, motion compensation circuitry may be provided in or coupled to the laser beam source where the compensation circuitry is configured to produce a signal representing motion of the laser beam source. The signal produced by the motion compensation circuitry typically represents motion in three dimensions and may be produced by, for example, a three-axis accelerometer.

The systems of the present invention may still, further comprises communications circuitry configured to transmit movement data calculated by the computer processor. In a first instance, the communications circuitry may be configured to transmit data to a local control unit associated with the structure. Alternatively or additionally, the communications circuitry may be configured to transmit data to a remote data storage or processing site, e.g. the "cloud."

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments in which the principles of the invention are utilized and the accompanying drawings of which:

DETAILED DESCRIPTION OF THE INVENTION

All physical structures are constantly subjected to stress from various loads due to natural and man-made forces. Examples include buildings resisting loads from wind and bridges resisting road traffic, flowing rivers and wind. The amount of deflection and other movement of the structure results from a combination of both the integrity of the structure and forces incident on the structure which produce deforming loads. The systems and methods of the present invention provide accurate and economic measurement of the deflection of a structure as it is subject to various forces.

An exemplary system according to the present invention includes a fixed laser, a target device, a camera or optic array, and other electronics and computers and communication systems. The laser is directed onto a target device, which is attached to the moving portion of the structure. A camera or position sensitive detector in the target device is used to detect and or record the laser image or point that is produced on the target device. The position of the laser image or point on the target device derived from position sensitive detector or camera with algorithms can be used to accurately detect movement or deflection of the structure. The laser will remain fixed and as the structure with target device attached moves or deflects due to environmental or physical load the laser image or point on the target device screen will move proportionally. The differences in the position of the laser image or point in 2 dimensions perpendicular to the laser beam will be directly proportional to the movement of the bridge or structure. Using the position of the laser image or point the absolute movement or deflection of a structure can be determined. This information can be recorded and stored at the target device and or sent through wireless or directly wired to a local device or through a wireless connection or directly wired to a remote location for storage and further analysis. The device can be used in connection to other sensors such as strain gauges, temperature, wind indicators and other sensors.

Figure 1:
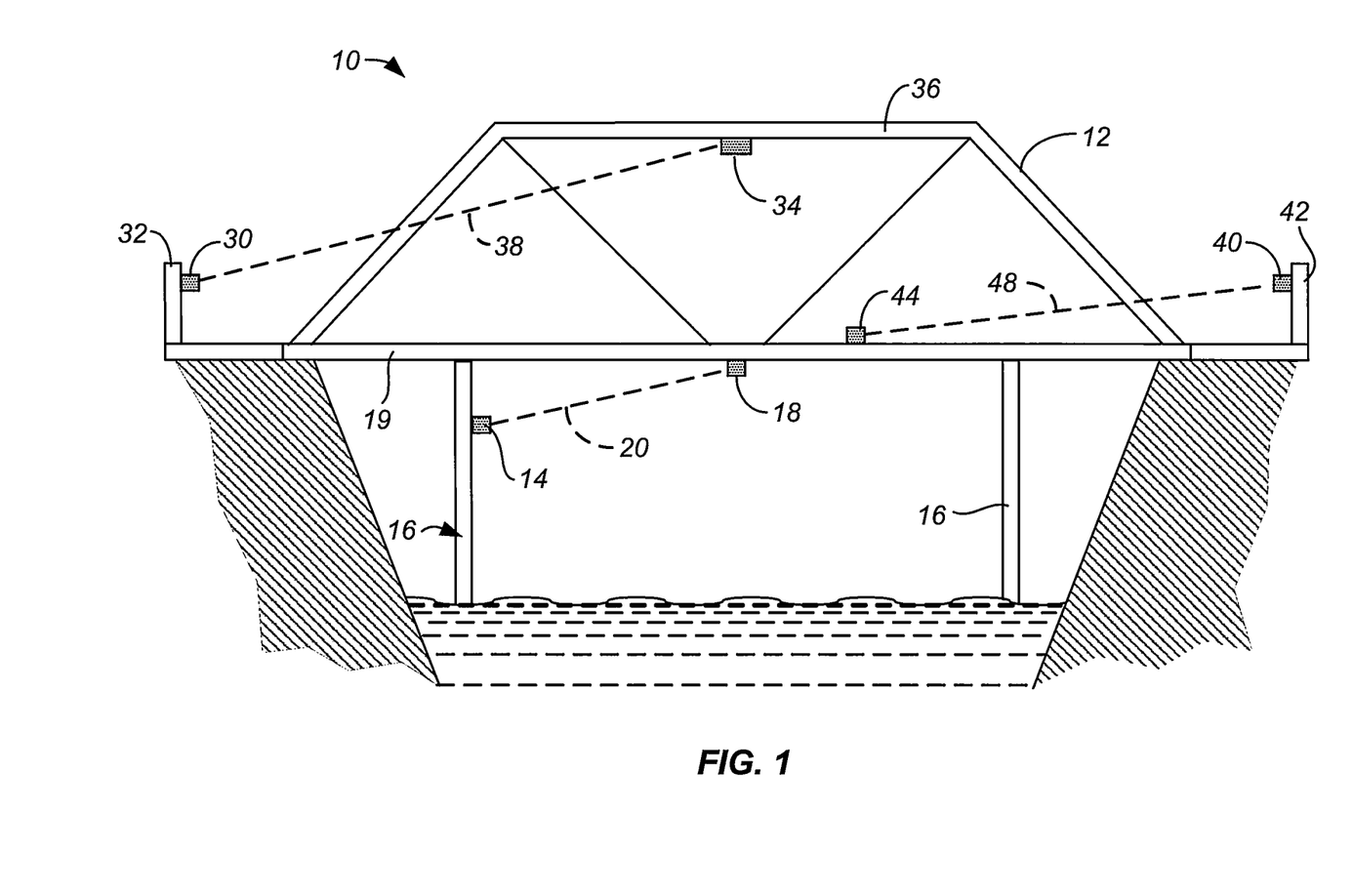
FIG. 1 illustrates a bridge instrumented with the movement measurement systems of the present invention.
Figure 2:
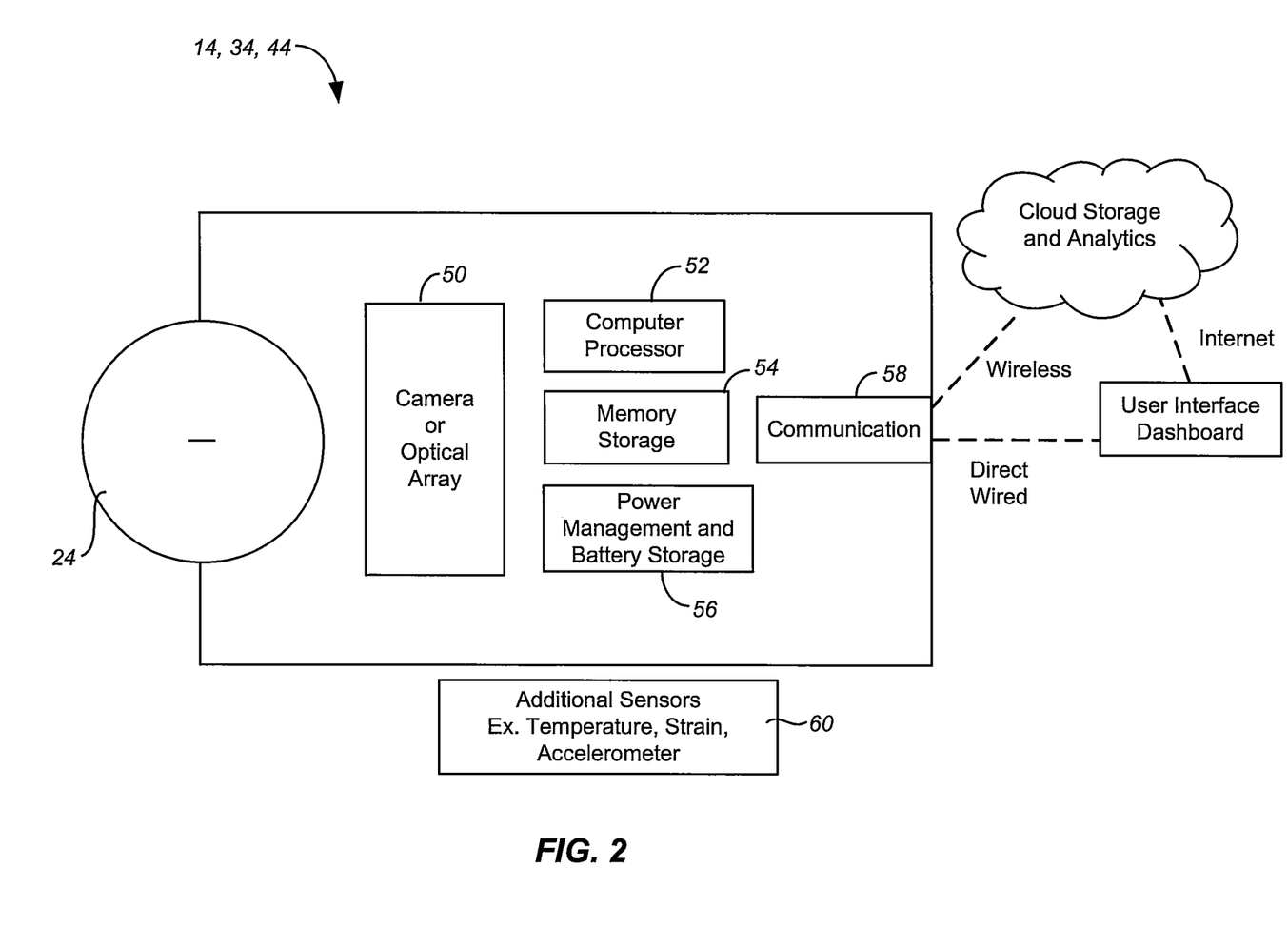
FIG. 2 is a simplified diagram of a target surface and associated circuitry and components constructed in accordance with the principles of the present invention.
Figure 3:
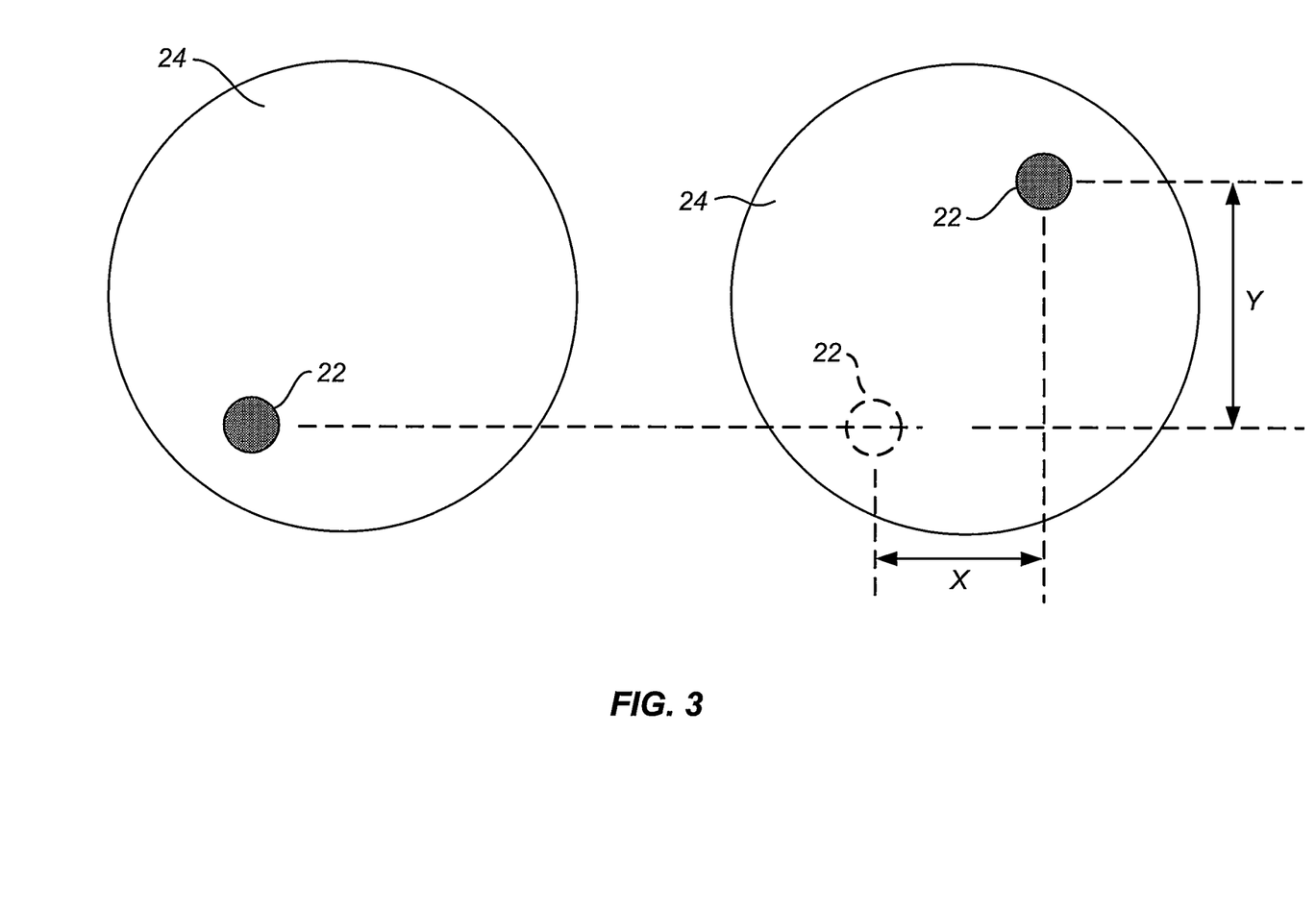
FIG. 3 illustrates a target screen as a tracking spot moves over its surface in response to movement of a structural component that is being tracked in accordance with the principles of the present invention.
Figure 4:
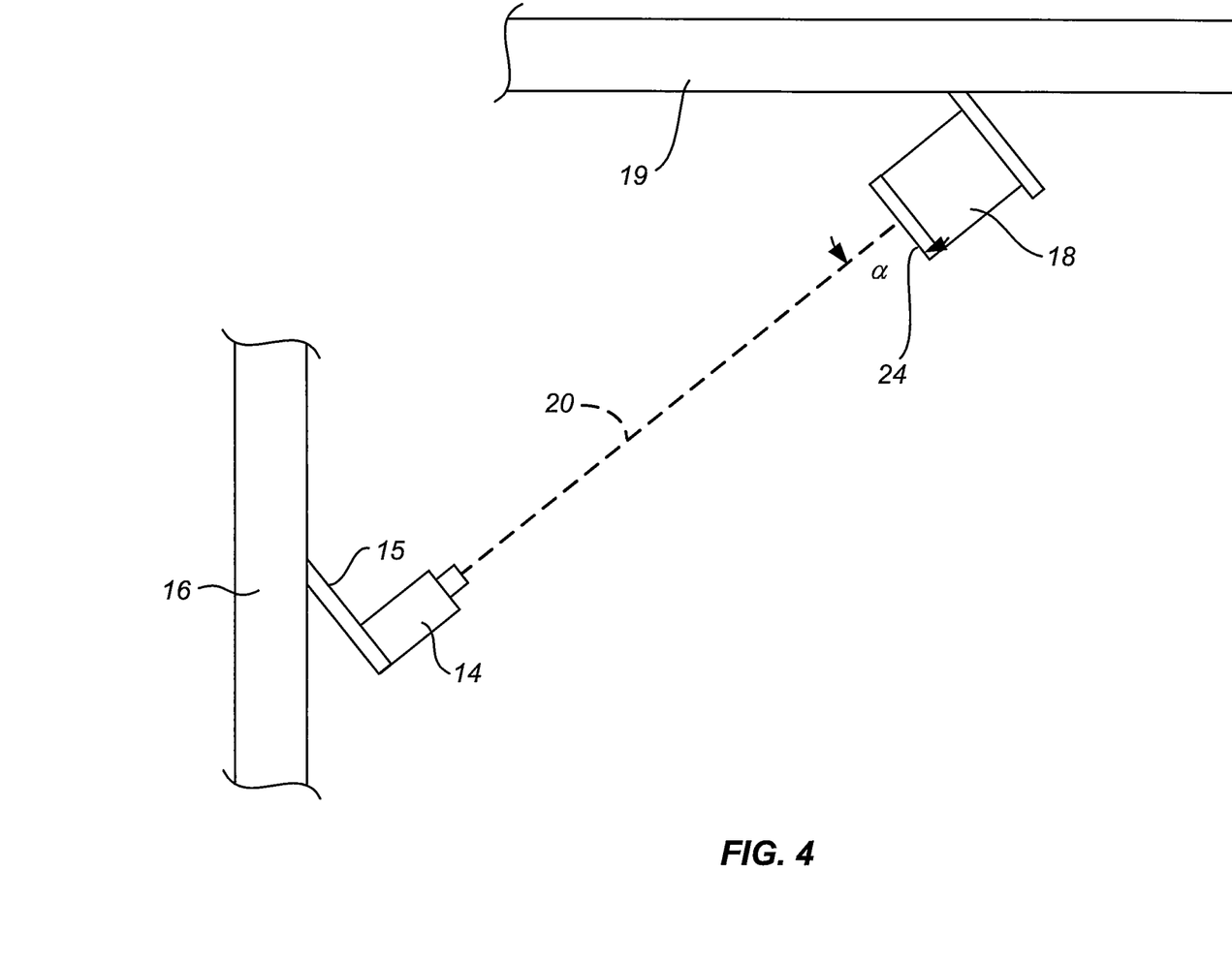
FIG. 4 illustrates the relative alignment of an exemplary laser beam source and a target surface on a bridge in accordance with the principles of the present invention.

FIG. 1 depicts the main components of an exemplary system 10 mounted on a bridge 12. A first laser beam source 14 is attached to a stable reference structure, such as a pier or abutment 16 of the bridge. The laser beam source 14 may be attached either temporarily for single or short-term use or permanently for long-term continuous or periodic measurements of the bridge structure deflection. A first target device 18 is attached to a structural component subject to stress, such as a component of the road way 19 which can deflect and move in response to traffic, wind loads, earthquakes, and other conditions. The first target device 18 receives a beam 20 from the first laser 14 to create a spot 22 or other image on a screen 24 (FIGS. 2, 3, and 4). Motion of the roadway relative to the pier will cause the spot 22 to move on the screen surface, allowing the relative motion to be calculated as described more fully below.

A second laser beam source 30 may be attached to ground adjacent to the bridge 10, typically on a post 32 or other structure isolated from the bridge. A second target device 34 is attached on a truss 36 or other component of the bridge superstructure. The second laser beam source 30 projects laser beam 38 to a screen 24 of the second target device 34 to create a spot 22 or other image on a screen 24 (FIGS. 2, 3, and 4). Movement of the spot 22 on the screen 24 of the second target device 34 may be tracked to calculate the relative movement of the truss 36 relative to the fixed reference of the ground.

A third laser beam source 40 may be attached to ground adjacent to the bridge 10, typically on a post 42 or other structure isolated from the bridge. A third target device 44 is attached another component of the road way 19. The third laser beam source 40 projects laser beam 48 to a screen 24 of the third target device 44 to create a spot 22 or other image on a screen 24 (FIGS. 2, 3, and 4). Movement of the spot 22 on the screen 24 of the third target device 34 may be tracked to calculate the relative movement of the road way 19 relative to the fixed reference of the ground.

Usually, the laser of laser beam source will remain static and stable during operation with some calibration due to temperature or other environmental changes. The laser may transmit a laser light beam in either a continuous or pulsed mode and will remain focused on the screen of the target device mounted to the bridge or other structure.

The ability to mount both the laser beam source and the target devices at various reference locations on the structure and adjacent locations provides great flexibility. Such flexibility in mounting and operating the instrument is useful and practical due to the various hazards and operating environment of a bridge or other structure. For example, a laser beam source could be mounted on the road before a bridge and a third target device could be attached to a bridge railing, avoiding the need to access under the bridge to mount any part of the system.

The target device will be configured to analyze the laser light image on the target screen and calculate the center of the image, typically a centroid of a generally circular spot, providing a more accurate location. The precise location of to spot can be determined at a time when the bridge or other structure is substantially free from loads and stress so that the initial location can serve as a reference point for subsequent calculations, i.e. the deviation or movement of the component being monitored is the difference between an actual location of the spot (measured in real time) and the initial reference location.

As the bridge or other structure is subject to random movement through environmental effects such as wind and temperature strain on the bridge it will record this movement through movement of the laser image on the target. Additionally the image will change location due to loads on the bridge due to vehicular traffic. Also for testing purposes a known vehicle or other load could be placed on the bridge to calibrate deflection from a known weight or force.

Analysis can be performed through various algorithms that will allow the filtering of the effects from environmental factors and the vehicular loading either through normal usage or in a testing mode. This decoupling of factors that influence the deflection of the bridge will add accuracy to the measurements and allow better comparisons over time as factors fluctuate.

The laser beam source will typically include a laser device with a mounting structure allowing it to be temporarily or permanently installed on a stable reference structure such as a bridge pier, or on a post or other support separate from the main structure being monitored. The laser provides a coherent light beam that projects the spot or other image on the target surface of the device located on the bridge or other structure to be monitored. The target device will typically contain a screen to capture the laser image and show the relative change of that image that is in proportion to the movement of the bridge in two dimensions.

FIG. 2 illustrates the components of an exemplary target device 14, 34, 44 including the target screen 24, a camera or optical array 50, a computer processor 52, memory storage 54, battery and power management circuitry 56, and communication electronics 58. A connection port 60 for additional sensors to be monitored by the target device may also be provided. The communication 58 will typically include wireless and/or wired communication for direct or indirect access to a cloud information environment. Usually, direct wired communication to a local or remote computer and/or additional sensor interface(s) will be provided.

The camera or optical array will view the laser image on the target screen and record the location in a set of pixels. The pixels will then be analyzed by the computer processor and a geometric center point calculated. The measurement will be recorded on a real time basis and be stored for comparison and determination of the absolute distance the structure has moved.

In addition FIG. 2 shows other connections for sensor input such as temperature and strain gauges. These additional measurements can be used for compensation of the measurement for the effects of temperature or can be used to further understand and analyze the effects of forces on the bridge. The set of measurements will be useful for adaptive learning over time as well as short term correlation of movement/displacement and strain on a bridge component or the entire structure.

FIG. 3 shows an example of how the spot 22 or other image artifact will move on the screen 24 in response to relative movement between a laser beam source and a target device. Initially, when the structure is free from stress and the structural component in a rest or non-deflected condition, the laser is aimed and a base or reference location of the laser spot is recorded and a center point calculated and stored. Subsequent locations of the spot 22 or other laser image artifact can also be detected and stored. A calculation can then be made of the distance between the two center points in both the X and Y dimensions which are the X and Y components of the displacement of the structure being measured. An initial location of a spot 22 is shown in the left panel of FIG. 3 and a subsequent location is shown in the right panel. The movements in the X and Y directions are marked. While the initial position of spot 22 in the left panel is not centered, it may be preferred to center the initial spot location when making the initial system adjustments and alignments.

FIG. 4 illustrates the alignment of the first laser beam source 14 and the first target device 18 in more detail. In particular, the first laser beam source 14 can be mounted on a bracket 15 attached to the pier 16. The first laser beam source 14 can be precisely aimed so that the beam 20 strikes target surface 24, preferably near its center when the bridge is under minimum stress. The target device 18 is also aligned so that the beam 20 the target surface 24 in a normal or perpendicular direction. While some deviation from normal (90°) is acceptable, it is preferred that the angle α of incidence remain in the range from 75° to 115°, preferably from 85° to 95°, so that the movement apparent of the target screen closely matches the actual structure movement.

The measurements taken by the instrument can be then uploaded and stored in a remote location along with a date/time stamp and structural ID number. Using wireless transmission, such as cellular or satellite communication, the information can be sent to a cloud storage and computer analysis location for further analysis both in the short term or longer term. The information can be also shared with a local controller to determine out of set point issues such as maximum allowed deflection and be connected to alarms on the bridge. This information can be displayed locally as an alarm on a bridge sign or as a red—yellow or green light indicating allowable access. The information can also be accessed in the cloud and analysis completed and displayed through an internet connection to a dashboard. Multiple displays of the same information can be simultaneously displayed on various computers and mobile devices.

A new bridge is instrumented with the device to determine the deflection versus the calculated design deflection with a known weight from a test truck. The truck is driven over the bridge and several measurements are taken on each span. The deflection is measured and recorded. The deflection information is used both for bridge certification and also as a bridge signature reference so that the measurement can be made in the future and a comparison over years to how the bridge structure is fatiguing against design.

A building is designed in a high wind location with allowable movement incorporated into the design. Two Laser Deflection Instruments are attached to the adjoining sides of the building to measure and record building movement under wind loads in two directions. Additionally a wind gauge is connected to the instrument to record wind velocity along with a temperature measurement. Using the total deflection from both instruments and correlating that with the wind velocity recorded over time, the actual performance of the building structure can be determined and compared to design calculations.

A 50 year old bridge nears the end of its design life. Multiple Laser Deflection Instruments are attached at the midpoint of a span to each of 7 girders. Each Instrument is also connected to a strain gauge also attached to each girder. The bridge is loaded with a test truck of pre-weighed amount and the deflection of each girder along with the strain and temperature at each of the 7 points measured and recorded. Multiple traverses of the test vehicle are made with the readings for each run recorded. The total set of data is reviewed against the predicted deflection under this known load. A calculation is made on the actual state of the bridge and if possible a higher rating is given to the structure due to the specific information on present bridge performance Once determined that the bridge has more useful life and greater structural integrity than the design data alone would predict the strain gauges and one Laser Deflection Instrument are left mounted on the bridge and used for continuous monitoring of the bridge state. The ongoing monitoring will allow accurate records of the actual stress that the bridge is experiencing and aid in future Bridge Management decisions.

An exemplary laser-based system for measuring small movements in accordance with the principles of the present invention comprises a laser, a translucent target screen for receiving the laser beam and producing a visible spot, and a camera fixedly coupled to the screen for tracking movement of the visible spot on the screen resulting from relative movement between the laser and the target screen.

The laser may be a green laser, such as a Nano Green 5 mW, commercially available from suppliers such as Wicked Lasers, Shanghai, China. The laser may be modified to be mounted on a structural component of a structure being monitored.

The target screen may comprise a translucent, Plexiglas® or similar acrylic sheet that is cut into a flat panel having suitable dimensions and a suitable geometry. For example, the panel may have an area in the range from 1 cm² to 50 cm², usually being in the range from 12 cm² to 30 cm². The geometry will usually be circular, typically having a diameter from 1 cm to 4 cm, usually from 2 cm to 3 cm, although other geometries, such as square, rectangular, oval, polygonal, irregular, and the like, are also useful.

The camera may be a commercial digital camera, such as a Cannon Power Shot S3, and may be combined with a fast vision sensor of a type used in robotics, such as Pixy CMU Sensor which has an onboard processor that finds and tracks the position of objects within the field of view of the camera. The camera is configured to track the laser spot as it moves across the target screen. In particular, the Pixy CMU Sensor may be configured to track a centroid of the laser spot on the screen. A digital output of the Pixy CMU sensor represents the two-dimensional location of the centroid on the screen and may be delivered to a computer processor, such as a general purpose, for processing by software configured to calculate the displacement of the laser spot on the screen over time. The displacement of the spot on the screen, in turn, will correspond to the relative displacement of the location on the structural component where the laser is attached and the location on or adjacent to the structure where the target screen is mounted. For example, the software can read and the x and y pixel values of the centroid exported from the Pixy CMU sensor.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that the methods and structures within the scope of these claims and their equivalents be covered thereby.

What is claimed is:

1. A method for measuring movement of a structural component of a structure, said method comprising:
   projecting a focused beam along a path from an origin, wherein projecting a focused beam comprises projecting a laser beam from a laser attached to a location on the structure and wherein the path intersects a target surface attached to the structural component at an incidence location;
   tracking movement of the incidence location on the target surface over time; and
   determining movement of the structural component relative to the origin based on the tracked movement of the incidence location on the target surface to generate movement data.

2. A method as in claim 1, wherein the location on the structure the laser is attached is more resistant to movement than is the structural component.

3. A method as in claim 2, wherein the structure is a bridge, the origin is on a pier of the bridge, and the structural component is part of a roadway of the bridge.

4. A method as in claim 1, wherein the laser is attached to a secondary structure which is isolated from the structure which includes the structural component.

5. A method as in claim 4, wherein the laser is mounted adjacent to a bridge and the structural component is part of a pier, a roadway, or a superstructure.

6. A method as in claim 1, wherein the target surface is planar.

7. A method as in claim 6, wherein the planar surface is oriented at an incidence angle the range from 75° to 115° relative to the beam path.

8. A method as in claim 1, wherein the target surface is translucent and movement of the beam incidence location is performed with a camera located behind the translucent surface.

9. A method as in claim 6, wherein the focus beam path is aligned to intersect the target surface near a center thereof when the structural component is at rest relative to the origin of the path.

10. A method as in claim 9, wherein the target surface has a circular periphery and the beam path intersects the target surface at a center of the circular periphery when the structural component is at risk.

11. A method as in claim 1, further comprising tracking motion of the origin of the focused beam path and compensating for the tracked motion of the origin when determining movement of the structural component relative to the origin based on the tracked movement of the incidence location on the target surface.

12. A method as in claim 1, further comprising transmitting the movement data.

13. A method as in claim 12, wherein the movement data are transmitted to a local control unit associated with the structure.

14. A method as in claim 12, wherein the movement data are transmitted to a remote data storage or processing site.

15. A system for measuring movement of a structural component of a structure, said system comprising:
    a projector configured to direct a beam from an origin having a fixed location relative to the structure, wherein the projector comprises a laser attached to a location on the structure;
    a target surface configured to be fixed to the structural component and to receive the beam from the projector at an incidence location on the surface;
    a camera coupled to the target surface to detect the position of the incidence location as it moves over time in response to relative movement between the structural component and the origin; and
    a computer processor configured to receive data from the camera and calculate the magnitude of movement of the structural component relative to the origin over time.

16. A system as in claim 15, wherein the location on the structure is more resistant to movement than is the structural component.

17. A system as in claim 15, wherein the structure is a bridge and the laser is configured to be secured to a pier of the bridge and the target surface is configured to be secured to a roadway of the bridge.

18. A system as in claim 15, wherein the laser is configured to be attached to a secondary structure which is isolated from the structure which includes the structural component.

19. A system as in claim 18, wherein the laser is configured to be mounted adjacent to a bridge and the target surface is configured to be secured to a pier, a roadway, or a superstructure of the bridge.

20. A system as in claim 15, wherein the target surface comprises a translucent screen which produces a spot when hit by the beam.

21. A system as in claim 20, wherein the target surface further comprises a camera which can track the spot as it moves over the target surface in response to movement of the structural component.

22. A system as in claim 15, further comprising motion compensation circuitry in or coupled to the laser beam source and configured to produce a signal representing motion of the laser beam source.

23. A system as in claim 22, wherein the signal produced by the motion compensation circuitry represents motion in three dimensions.

24. A system as in claim 22, the motion compensation circuitry comprises a three-axis accelerometer.

25. A system as in claim 15, further comprising communications circuitry configured to transmit movement data calculated by the computer processor.

26. A system as in claim 25, wherein the communications circuitry is configured to transmit data to a local control unit associated with the structure.

27. A system as in claim 26, wherein the communications circuitry is configured to transmit data to a remote data storage or processing site.

* * * * *